US012604894B2

(12) United States Patent
Oka et al.

(10) Patent No.: US 12,604,894 B2
(45) Date of Patent: Apr. 21, 2026

(54) SOLID PESTICIDAL FORMULATION

(71) Applicant: SUMITOMO CHEMICAL COMPANY, LIMITED, Chuo-ku (JP)

(72) Inventors: Atsushi Oka, Takarazuka (JP); Ai Rusu, Takarazuka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 304 days.

(21) Appl. No.: 18/254,321

(22) PCT Filed: Nov. 30, 2021

(86) PCT No.: PCT/JP2021/043747
§ 371 (c)(1),
(2) Date: May 24, 2023

(87) PCT Pub. No.: WO2022/118813
PCT Pub. Date: Jun. 9, 2022

(65) Prior Publication Data

US 2024/0008489 A1 Jan. 11, 2024

(30) Foreign Application Priority Data

Dec. 1, 2020 (JP) ................................ 2020-199849

(51) Int. Cl.

*A01N 43/54* (2006.01)
*A01N 25/08* (2006.01)
*A01N 25/12* (2006.01)
*A01N 25/30* (2006.01)
*A01P 13/00* (2006.01)

(52) U.S. Cl.

CPC ............. *A01N 43/54* (2013.01); *A01N 25/12* (2013.01); *A01N 25/30* (2013.01); *A01P 13/00* (2021.08)

(58) Field of Classification Search

CPC .......... A01N 43/54; A01N 25/08; A01P 13/00
See application file for complete search history.

(56) References Cited

U.S. PATENT DOCUMENTS

| | | | |
|---|---|---|---|
| 5,200,401 | A | 4/1993 | Roechling et al. |
| 6,537,948 | B1 | 3/2003 | Tohyama et al. |
| 2004/0254077 | A1 | 12/2004 | Tohyama et al. |

FOREIGN PATENT DOCUMENTS

| | | | |
|---|---|---|---|
| CN | 103444708 | A | 12/2013 |
| JP | 7-118109 | A | 5/1995 |
| JP | 2002-155061 | A | 5/2002 |
| JP | 2002-363170 | A | 12/2002 |
| JP | 2015-501322 | A | 1/2015 |
| JP | 2020-530025 | A | 10/2020 |
| WO | WO 2003/014109 | A1 | 2/2003 |
| WO | WO 2013/063471 | A1 | 5/2013 |
| WO | WO 2017/065013 | A1 | 4/2017 |
| WO | WO 2019/030098 | A1 | 2/2019 |

OTHER PUBLICATIONS

International Search Report Issued Feb. 8, 2022, in PCT/JP2021/043747, filed on Nov. 30, 2021, 2 pages.

*Primary Examiner* — Bruck Kifle
(74) *Attorney, Agent, or Firm* — Oblon, McClelland, Maier & Neustadt, L.L.P.

(57) ABSTRACT

A solid pesticidal composition comprises a compound represented by the following formula (I), a surfactant, and a solid carrier, wherein a water content is 0.3 wt % or more and 5.0 wt % or less.

(I)

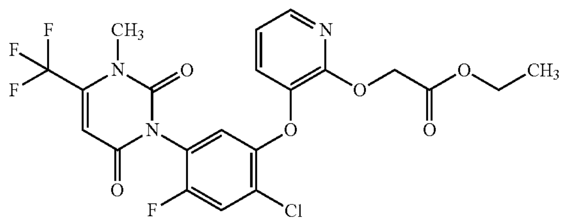

4 Claims, No Drawings

SOLID PESTICIDAL FORMULATION

CROSS-REFERENCE TO RELATED APPLICATIONS

The present application is a 35 U.S.C. § 371 national stage patent application of International patent application PCT/JP2021/043747, filed on Nov. 30, 2021, which is based on and claims the benefits of priority to Japanese Application No. 2020-199849, filed on Dec. 1, 2020. The entire contents of these applications are incorporated herein by reference.

TECHNICAL FIELD

The present invention relates to a solid pesticidal formulation.

BACKGROUND ART

A compound represented by the following formula (I) (hereinafter, also called "compound (I)"), which is an active ingredient for herbicides, is known as a pesticidal active ingredient (see e.g., Japanese Patent Laying-Open No. 2002-363170 (PTL 1), Japanese Patent Laying-Open No. 2002-155061 (PTL 2), and WO 2003/014109 (PTL 3)).

(I)

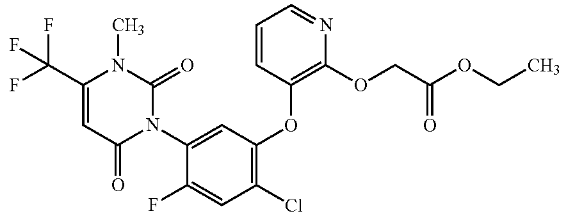

CITATION LIST

Patent Literature

PTL 1: Japanese Patent Laying-Open No. 2002-363170
PTL 2: Japanese Patent Laying-Open No. 2002-155061
PTL 3: WO 2003/014109

SUMMARY OF INVENTION

Technical Problem

An object of the present invention is to provide a solid pesticidal formulation that can prevent the degradation of a compound (I) and has favorable dispersibility in water when mixed with water.

Solution to Problem

As a result of studies to find a composition that contains a compound represented by the formula (I), prevents its degradation, and has favorable dispersibility when mixed with water, the present inventors have found that the value of a water content is set to a specific range, whereby the degradation of the compound represented by the formula (I) in the composition is prevented and dispersibility when mixed with water is favorable.

Specifically, the present invention provides the following solid pesticidal composition.

[1] A solid pesticidal composition comprising a compound represented by the following formula (I), a surfactant, and a solid carrier, wherein a water content is 0.3 wt % or more and 5.0 wt % or less:

(I)

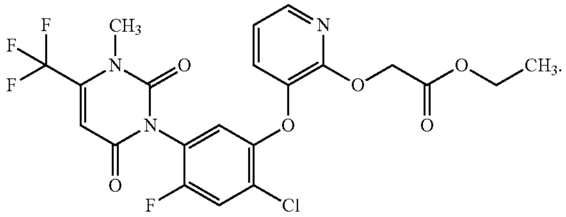

[2] The solid pesticidal composition according to [1], wherein the surfactant comprises an anionic surfactant.

[3] The solid pesticidal composition according to [1] or [2], wherein a shape of the solid pesticidal composition is a granular shape.

Advantageous Effects of Invention

According to the present invention, it is made possible to provide a solid pesticidal formulation that can prevent the degradation of a compound (I) and has favorable dispersibility in water when mixed with water.

DESCRIPTION OF EMBODIMENTS

A solid pesticidal composition according to the present invention (hereinafter, also called "composition of the present invention") contains a compound (I), a surfactant, and a solid carrier, wherein a water content is 0.3 wt % or more and 5.0 wt % or less.

The composition of the present invention can be used as wettable powders or water dispersible granules which are rapidly dispersed when added into water.

The composition of the present invention contains a compound (I). The compound (I) is a known compound and has an excellent herbicidal efficacy. The compound (I) can be synthesized by, for example, a method described in PTLs 1 to 3.

(I)

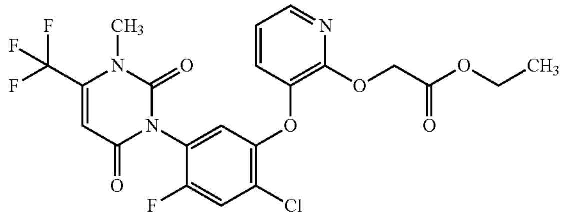

The compound (I) is a solid at a temperature of 25° C. The compound (I) in the composition of the present invention may be present in a solid state in the composition of the present invention, but may be present in a state dissolved in an organic solvent.

When the compound (I) is present in a state dissolved in an organic solvent in the composition of the present invention, examples of the organic solvent used include the following organic solvents:

esters such as methyl caprylate, methyl laurate, methyl myristate, methyl salicylate, methyl palmitate, methyl oleate, ethyl acetate, ethyl palmitate, octyl acetate, benzyl acetate, dimethyl phthalate, diethyl phthalate, methyl benzoate, ethyl benzoate, butyl benzoate, dimethyl 2-methylglutarate, dimethyl 2-ethylsuccinate, dimethyl adipate, dioctyl succinate, diisobutyl adipate, didecyl adipate, tributyl acetylcitrate, tert-butyl acetoacetate, allyl acetoacetate, 2-ethylhexyl lactate, and butyl propionate;

ethers such as dimethyl isosorbide;

ketones such as 2-heptanone;

amides such as N,N-dimethyloctanamide, N,N-dimethyldecanamide, N,N-dimethyldodecanamide, N,N-dimethyltetradecanamide, N,N-dimethyloctadecanamide, N,N-dimethyl-9-decenamide, and fatty acid dimethylamide; and aromatic hydrocarbons such as alkylbenzenes (e.g., toluene, xylene, ethylbenzene, octadecylbenzene, dialkylbenzene, and trialkylbenzene), alkylnaphthalenes (e.g., methylnaphthalene, dimethylnaphthalene, dodecylnaphthalene, and tridecylnaphthalene), phenylxylylethane, 1-phenyl-1-ethylphenylethane, and butylbiphenyl, and mixtures thereof.

The content of the compound (I) in the composition of the present invention is usually 0.01 wt % or more, preferably 0.05 wt % or more, more preferably 0.1 wt % or more, and may be 0.3 wt % or more, may be 0.5% wt % or more, and may be 1.0 wt % or more. The content of the compound (I) in the composition of the present invention is usually 80 wt % or less, preferably 70 wt % or less, more preferably 60 wt % or less, and may be 50 wt % or less, may be 40 wt % or less, and may be 30 wt % or less.

The composition of the present invention contains one, two, or more surfactants. Examples of the surfactant include anionic surfactants, nonionic surfactants, cationic surfactants, amphoteric surfactants, and mixtures thereof. A preferable surfactant is an anionic surfactant and/or a nonionic surfactant.

A preferable anionic surfactant is a sulfonate, a sulfuric acid ester salt, a phosphoric acid ester salt, a carboxylate, and a mixture thereof. Examples of the sulfonate include naphthalenesulfonate and salts of formaldehyde condensates thereof, alkylbenzenesulfonates, alkylnaphthalenesulfonates, alkyl diphenyl ether disulfonates, α-olefinsulfonate, ligninsulfonate, polyoxyethylene alkyl phenyl ether sulfonates, and dialkylsulfosuccinates. Examples of the sulfuric acid ester salt include alkylsulfuric acid ester salts, polyoxyethylene alkyl ether sulfuric acid ester salts, and polyoxyethylene alkyl phenyl ether sulfuric acid ester salts. Examples of the phosphoric acid ester salt include polyoxyethylene alkyl aryl ether phosphoric acid ester salts and polyoxyethylene tristyryl phenyl ether phosphoric acid ester salts. Examples of the carboxylate include fatty acid salts and polycarboxylates.

Examples of the preferable nonionic surfactant include polyoxyethylene alkyl ethers, polyoxypropylene alkyl ethers, polyoxyethylene polyoxypropylene alkyl ethers, polyoxyethylene distyryl phenyl ether, polyoxyethylene tristyryl phenyl ether, polyoxyethylene castor oil, sucrose fatty acid esters, sorbitan fatty acid esters, polyoxyethylene sorbitan fatty acid esters, glycerin fatty acid esters, polyoxyethylene fatty acid esters, polyoxyethylene alkylamines, alkylalkanolamides, polyoxyethylene polyoxypropylene block copolymers, and alkylpolyglycosides.

Preferable examples of the cationic surfactant include alkylamine salts and quaternary ammonium salts. Preferable examples of the amphoteric surfactant include alkylbetaines.

The content of the surfactant in the composition of the present invention is usually 1 wt % or more, preferably 3 wt % or more, and may be 5 wt % or more. The content of the surfactant in the composition of the present invention is usually 30 wt % or less, preferably 20 wt % or less, more preferably 15 wt % or less, and may be 10 wt % or less. When the composition of the present invention contains two or more surfactants, the content of the surfactant refers to the total content thereof.

The composition of the present invention contains one, two, or more solid carriers. The solid carrier may be a water-insoluble solid carrier or may be a water-soluble solid carrier. The water-soluble solid carrier herein refers to a solid carrier having a water solubility of 1 g/L or more at a temperature of 20° C., and the water-insoluble solid carrier refers to a solid carrier having a water solubility of less than 1 g/L at a temperature of 20° C. Examples of the water-insoluble solid carrier include fine powders of mineral substances such as diatomaceous earth, mica, talc, clay, bentonite, dolomite, Japanese acid clay, pyrophyllite, calcite, calcium carbonate, calcium silicate, calcium sulfate, magnesium sulfate, and magnesium oxide, and fine powders of organic substances such as crystalline cellulose and walnut shell flour. Examples of the water-soluble solid carrier include saccharides such as glucose, sucrose, fructose, and lactose, water-soluble polymer powders such as methylcellulose, carboxymethylcellulose sodium, and alginic acid propylene glycol ester, water-soluble organic fine powders such as urea, and fine powders of inorganic salts such as ammonium sulfate salts.

The content of the solid carrier in the composition of the present invention is usually 5 wt % or more, preferably 10 wt % or more, more preferably 20 wt % or more, and may be 50 wt % or more and may be 70 wt % or more. The content of the solid carrier in the composition of the present invention is usually 95 wt % or less, preferably 90 wt % or less, and may be 80 wt % or less, may be 60 wt % or less, and may be 50 wt % or less. When the composition of the present invention contains two or more solid carriers, the content of the solid carrier refers to the total content thereof.

The composition of the present invention may optionally contain other optional formulation auxiliary ingredients. Examples of other formulation auxiliary ingredients include binders, antifoaming agents, colorants, and fragrances. However, the composition of the present invention contains 70 wt % or more, or 75 wt % or more, in total of the compound (I), the surfactant, and the solid carrier.

Examples of the binders include sodium alginate, polyvinyl alcohol, gum arabic, dextrin, and starch. The content of the binder in the composition of the present invention is usually 0.1 wt % or more and 5 wt % or less.

Examples of the antifoaming agent include silicone-based antifoaming agents. The content of the antifoaming agent in the composition of the present invention is usually 0.01 wt % or more and 1 wt % or less.

The composition of the present invention may further contain one or more additional herbicidal active compounds other than the compound (I).

Examples of other herbicidal active compounds other than the compound (I) include the following:

2,3,6-TBA (2,3,6-trichlorobenzoic acid), 2,3,6-TBA-dimethylammonium, 2,3,6-TBA-lithium, 2,3,6-TBA-potassium, 2,3,6-TBA-sodium, 2,4-D (2,4-dichlorophenoxyacetic acid), 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isoctyl, 2,4-D-isopropyl, 2,4-D-isopropylammonium, 2,4-D-lithium, 2,4-D-meptyl, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl)ammonium, 2,4-D-trolamine, 2,4-DB (2,4-dichlorophenoxybutyric acid), 2,4-DB choline salt, 2,4-DB-biproamine, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialaphos, bicyclopyrone, bifenox, bispyribac, bispyribac-sodium, bixlozone, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dicamba, dicamba choline salt, dicamba-biproamine, dicamba-trolamine, dicamba-diglycolamine, dicamba-dimethylammonium, dicamba-diolamine, dicamba-isopropylammonium, dicamba-methyl, dicamba-olamine, dicamba-potassium, dicamba-sodium, dichlobenil, dichlorprop, dichlorprop choline salt, dichlorprop-biproamine, dichlorprop-etexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-etexyl, dichlorprop-P-dimethylammonium, dichlorprop-potassium, dichlorprop-sodium, diclofop, diclofop-methyl, diclosulam, difenoxuron, difenzoquat, difenzoquat metilsulfate, diflufenican, diflufenzopyr, diflufenzopyr-sodium, dimefuron, dimepiperate, dimethachlor, dimethametryn, dimethenamid, dimethenamid-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P, glufosinate-P-ammonium, glufosinate-P-sodium, glyphosate, glyphosate choline salt, glyphosate-isopropylammonium, glyphosate-biproamine, glyphosate-ammonium, glyphosate-diammonium, glyphosate-potassium, glyphosate-sodium, glyphosate-trimesium, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy)acetic acid), MCPA choline salt, MCPA-biproamine, MCPA-etexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy)butanoic acid), MCPB choline salt, MCPB-biproamine, MCPB-ethyl, MCPB-methyl, MCPB-sodium, mecoprop, mecoprop choline salt, mecoprop-biproamine, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefiryl, quizalofop-P, quizalofop-P-ethyl, quizalofop-P-tefuryl, rimsulfuron, saflufenacil, sethoxydim, EPTC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, sulfosulfuron, swep, TCA (2,2,2-trichloroacetic acid), TCA-ammonium, TCA-calcium, TCA-ethadyl, TCA-magnesium, TCA-sodium, tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfiron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, 4-(4-fluorophenyl)-6-[(2-hydroxy-6-oxo-1-cyclohexen-1-yl)carbonyl]-2-methyl-1,2,4-triazine-3,5(2H,4H)-dione, 2-chloro-N-(1-methyl-1H-tetrazol-5-yl)-3-(methylthio)-4-(trifluoromethyl)benzamide, 2-methyl-N-(5-methyl-1,3,4-oxadiazol-2-yl)-3-(methanesulfonyl)-4-(trifluoromethyl)benzamide, 4-amino-3-chloro-5-fluoro-6-(7-fluoro-1H-indol-6-yl)pyridine-2-carboxylic acid, 4-amino-3-chloro-5-fluoro-6-(7-fluoro-1H-indol-6-yl)pyridine-2-carboxylic acid cyanomethyl ester, (2R,4R)-4-({[(5S)-3-(3,5-difluorophenyl)-5-vinyl-4,5-dihydroisoxazol-5-yl]carbonyl}amino)tetrahydrofuran-2-carboxylic acid methyl ester, (2S,4S)-4-({[(5R)-3-(3,5-difluorophenyl)-5-vinyl-4,5-dihydroisoxazol-5-yl]carbonyl}amino)tetrahydrofuran-2-carboxylic acid methyl ester, 3-[(isopropylsulfonyl)methyl]-N-(5-methyl-1,3,4-oxadiazol-2-yl)-5-(trifluoromethyl)-1,2,4-triazolo[4,3-a]pyridine-8-carboxamide, 1-{2-chloro-6-[(5-chloropyrimidin-2-yl)oxy]phenyl}-4,4,4-trifluorobutan-1-one, and 5-chloro-2-{3-chloro-2-[5-(difluoromethyl)isoxazol-3-yl]phenoxy}pyrimidine.

The water content of the composition of the present invention is 0.3 wt % or more and 5.0 wt % or less. The water content is preferably 0.5 wt % or more, more preferably 0.6 wt % or more, and may be 0.8 wt % or more, may be 1.0 wt % or more, and may be 1.2 wt % or more. The water content is preferably 4.9 wt % or less, more preferably 4.7 wt % or less, and may be 4.5 wt % or less, may be 4.3 wt % or less, may be 4.1 wt % or less, and may be 3.9 wt % or less.

The water content of the composition of the present invention herein is expressed in percentage of the weight of water contained in the composition of the present invention, and measured using an infrared moisture meter (FD-610 model, manufactured by Kett Electric Laboratory) of loss on drying (heating and drying/mass measurement method). The weight of a sample is set to about 2 g, and the temperature is set to 105° C. A value at which the amount of change in the moisture of the sample becomes 0.1% or less in 2 minutes is adopted as the water content.

The water content of the composition of the present invention is 5.0 wt % or less, whereby the degradation of the compound (I) can be prevented. The degree of degradation of the compound (I) herein is evaluated from the residual rate of the compound (I) under conditions described in Examples mentioned later.

The water content of the composition of the present invention is 0.3 wt % or more, whereby favorable dispersibility in water can be obtained when the composition of the present invention is mixed with water. The dispersibility herein is evaluated from the amount of residues in a wet sieving test which is conducted by dispersing the composition of the present invention in water, as described in Examples mentioned later. The composition of the present invention can thereby be prevented from blocking a nozzle of a sprayer, and the compound (I) can be properly applied.

The composition of the present invention can be produced using, for example, the compound (I), the surfactant, the solid carrier, and optional water and formulation auxiliary ingredient. Examples of the water that is used in producing the composition of the present invention include ion-exchange water, tap water, and groundwater. When the composition of the present invention is water dispersible granules, examples of the production method include extrusion granulation methods, rolling granulation methods, spray granulation methods, fluidized-bed granulation methods, stirring granulation methods, and coating granulation methods.

In the following, production methods in the case of producing the composition of the present invention by the extrusion granulation method will be illustrated. A production method 1 is a production method when the compound (I) is present in a solid state in the composition of the present invention, and production methods 2 and 3 are production methods when the compound (I) is present in a state dissolved in an organic solvent in the composition of the present invention.

(Production Method 1)

S1) The compound (I), the surfactant, the solid carrier, and an optional formulation auxiliary ingredient are mixed to obtain a mixed powder. The mixed powder may be milled, if necessary.

S2) To the obtained mixed powder, optional water is added and kneaded to obtain a kneaded product. An optional antifoaming agent and/or colorant, etc. can be dissolved or dispersed in the water. Alternatively, instead of adding the surfactant in S1), the surfactant may be added to the water.

S3) The obtained kneaded product is extruded through a screen having holes with a predetermined diameter to obtain granulated materials.

S4) The obtained granulated materials are crushed into a predetermined length, and drying and particle size regulation are performed to obtain the composition of the present invention.

(Production Method 2)

S1) The compound (I), the organic solvent, an optional portion of the surfactant, and an optional formulation auxiliary ingredient are mixed to obtain a solution of the compound (I).

S2) The solid carrier, the surfactant, and an optional formulation auxiliary ingredient are mixed to obtain a mixed powder. The mixed powder may be milled, if necessary.

S3) The mixed powder obtained in S2) and the solution obtained in S1) are mixed to obtain a mixture. In this respect, it is preferable to mix 5 to 30 wt % of the solution with the mixed powder.
S4) To the obtained mixture, optional water is added and kneaded to obtain a kneaded product. An optional antifoaming agent and/or colorant, etc. can be dissolved or dispersed in the water.
S5) The obtained kneaded product is extruded through a screen having holes with a predetermined diameter to obtain granulated materials.
S6) The obtained granulated materials are crushed into a predetermined length, and drying and particle size regulation are performed to obtain the composition of the present invention.
(Production Method 3)
S1) The compound (I), the organic solvent, an optional portion of the surfactant, and an optional formulation auxiliary ingredient are mixed to obtain a solution of the compound (I).
S2) The solid carrier, the surfactant, and an optional formulation auxiliary ingredient are mixed to obtain a mixed powder. The mixed powder may be milled, if necessary.
S3) To the mixed powder obtained in S2), optional water is added and kneaded to obtain a kneaded product. An optional antifoaming agent and/or colorant, etc. can be dissolved or dispersed in the water.
S4) The obtained kneaded product is extruded through a screen having holes with a predetermined diameter to obtain granulated materials.
S5) The obtained granulated materials are crushed into a predetermined length, and drying and particle size regulation are performed to obtain a solid composition.
S6) The obtained solid composition and the solution obtained in S1) are mixed to obtain the composition of the present invention.

The shape of the composition of the present invention may be a powdery shape or may be a granular shape. When the shape of the composition of the present invention is a granular shape, the particle size of the composition of the present invention may be usually 95% or more in terms of the proportion of granules that pass through a sieve having a mesh size of 1700 μm and do not pass through a sieve having a mesh size of 300 μm, or 95% or more in terms of the proportion of granules that pass through a sieve having a mesh size of 1400 μm and do not pass through a sieve having a mesh size of 500 μm.

When the composition of the present invention is in a powdery shape, the volume median diameter of the composition of the present invention is usually 1 μm or larger and may be 3 μm or larger, may be 5 μm or larger, may be 10 μm or larger, and may be 20 μm or larger, and is usually 100 μm or smaller and may be 80 μm or smaller, may be 50 μm or smaller, and may be 30 μm or smaller.

The volume median diameter of the composition of the present invention is a value measured using a laser diffraction particle size distribution measurement apparatus, and is determined by measuring a sample of the composition of the present invention dispersed in water. The volume median diameter, also called median diameter, is a typical characteristic value that represents a particle size distribution in a collection of particles. The volume median diameter refers to the particle diameter of particles that reaches 50% based on the total volume of the collection of particles (cumulative 50% volume particle diameter) determined by determining the particle diameters of individual particles in a collection of particles, and accumulating the volumes of the particles in the ascending order of the particle diameters, with the total volume of the collection of particles being taken as 100%. The measurement can be performed using Mastersizer 3000 (manufactured by Spectris Co., Ltd.) as a commercially available laser diffraction particle size distribution measurement apparatus (measurement conditions are as follows: measurement object: spherical, refractive index: 1.52, absorptance: 0.1, density: 1 ($g/cm^3$), dispersion medium: water (refractive index: 1.33)).

The water content of the composition of the present invention can be adjusted by appropriately adjusting the amount of water added in the step to obtain a kneaded product or drying conditions in drying crushed granulated materials.

The composition of the present invention can be used in crop lands such as dry fields, orchard fields, pastures, lawn fields, and forestry fields; and non-crop lands such as levee slopes, riverbeds, shoulders and slopes of the roads, railroads, parks and green spaces, playgrounds, automobile parks, airports, and industrial plant sites such as factories and storage facilities as well as idle fields and urban deserts, thereby controlling weeds.

The composition of the present invention is usually mixed with water so as to attain the desired application concentration, and thereby prepared into a spray liquid. Users apply the spray liquid from a knapsack sprayer, a spray tank, a spray plane, or an irrigation system. The amount of spray differs depending on climate conditions, the timing of treatment, soil conditions, target crops, target weeds, etc. and usually 10 L or more and 2000 L or less, preferably 50 L or more and 400 L or less, of the spray liquid per hectare are applied. Also, the spray liquid is prepared by mixing the composition of the present invention with water in usually from 2 to 10000 times, preferably from 10 to 8000 times, more preferably from 15 to 6000 times the volume of the composition.

In applying the spray liquid, it may be mixed with an adjuvant. Although the type of the adjuvant is not particularly limited, it is desirable to mix an oil-based adjuvant (a mineral oil such as a paraffinic hydrocarbon, a naphthenic hydrocarbon, or an aromatic hydrocarbon, or a methylated seed oil in which a vegetable oil (soybean oil or rapeseed oil) is esterified) such as Agri-Dex or MSO at 0.25%, 0.5%, 1%, 2%, 3%, 4%, 5% or 6% (volume/volume) into the spray liquid, or a nonionic adjuvant (polyoxyalkylene alkyl ether, polyoxyalkylene fatty acid ester, alkylaryl alkoxylate, or alkylaryl polyoxyalkylene glycol) such as Induce at 0.05%, 0.1%, 0.25%, or 0.5% (volume/volume) into the spray liquid. Other examples thereof include anionic adjuvant (substituted sulfonates) such as Gramin S, cationic adjuvant (polyoxyethyleneamine) such as Genamin T 200BM, and organic silicone-based adjuvant such as Silwet L77. Furthermore, a drift control agent such as Intact (polyethylene glycol) or a volatilization-reducing agent such as Vapex, a VaporGrip Xtra Agent (mixture of potassium hydroxide and acetic acid) may be mixed. The pH or hardness of the spray liquid is not particularly limited.

EXAMPLES

In the following, the present invention will be described in further detail with reference to Examples and Comparative Examples, etc. The scope of the present invention is not limited to these Examples.

Production Example 1

1.0 part by weight of the compound (I), 5.0 parts by weight of Supragil MNS/90 (alkylnaphthalenesulfonate, manufactured by Solvay), 15.0 parts by weight of Stepwet DF-95 (sodium lauryl sulfate, manufactured by Stepan), and 79.0 parts by weight of Bentonite Hodaka (bentonite, manufactured by HOJUN Co., Ltd.) were well mixed, and milled and mixed using a centrifugal milling machine (ultracentrifugal milling machine ZM200, manufactured by Retsch). Subsequently, an appropriate amount of water was added thereto, further stirred, granulated at a screen diameter of 1.0 mmϕ using an extrusion granulator (Multigran MG-55-1, manufactured by DALTON), and after particle size regulation, draft-dried at a temperature of 90° C. for 20 minutes using a fluidized-bed dryer (FD-LAB-1, manufactured by Powrex Corp.) to obtain a composition (hereinafter, called "present composition 1").

Production Example 2

A composition (hereinafter, called "present composition 2") was obtained in the same manner as in Production Example 1 except that the draft drying conditions after granulation and particle size regulation were set to a temperature of 60° C. for 30 minutes.

Production Example 3

A composition (hereinafter, called "present composition 3") was obtained in the same manner as in Production Example 1 except that the draft drying conditions after granulation and particle size regulation were set to a temperature of 60° C. for 5 minutes.

Production Example 4

A composition (hereinafter, called "present composition 4") was obtained in the same manner as in Production Example 1 except that the draft drying conditions after granulation and particle size regulation were set to a temperature of 40° C. for 10 minutes.

Comparative Production Example 1

A composition (hereinafter, called "comparative composition 1") was obtained in the same manner as in Production Example 1 except that the draft drying conditions after granulation and particle size regulation were set to a temperature of 90° C. for 3 hours.

Comparative Production Example 2

A composition (hereinafter, called "comparative composition 2") was obtained in the same manner as in Production Example 1 except that the draft drying conditions after granulation and particle size regulation were set to a temperature of 30° C. for 1 minute.

[Measurement of Water Content of Composition]

The water content of each composition was measured using an infrared moisture meter (FD-610 model, manufactured by Kett Electric Laboratory) of loss on drying (heating and drying/mass measurement method). The weight of the sample was set to about 2 g, and the temperature was set to 105° C. The measurement was performed by an automatic stop method (measurement was completed when the amount of change in moisture became 0.1% or less in 2 minutes). The results are shown in Table 1.

Test Example 1

Each composition was housed in an aluminum bag, hermetically sealed by heat sealing, and then left standing and stored for 7 days in a thermostat having a temperature of 60° C. A content "a" of the active ingredient (compound (I)) contained in each composition thus stored, and a content "b" were analyzed by high-performance liquid chromatography (HPLC), and the residual rate of the active ingredient was evaluated according to the expression (r1) given below. The results are shown in Table 1.

$$\text{Residual rate [\%]}=(a/b)\times 100 \quad (r1)$$

wherein

"a" represents the content of the compound (I) in the composition after the storage, and "b" represents the content of the compound (I) in the composition before the storage.

Test Example 2

To a 250 mL measuring cylinder with a cap, 250 mL of water having a temperature of 30° C. (hardness: 342 ppm) was added, and 100 mg of each composition was gently added from a height of about 5 cm from the water surface. Subsequently, after being left standing for 5 minutes, the operation of inverting the measuring cylinder 1800 in 1 second and putting it back in place in 1 second was repetitively performed 30 times to obtain a dispersion. Then, the whole amount of the dispersion was passed through a 100-mesh (150 μm) sieve, and residues on the sieve were transferred to a glass petri dish using ion-exchange water. The residues in the glass petri dish were dried in a thermostat of 70° C. to completely remove moisture. Then, the weight was measured, and this was used as the amount of residues. The results are shown in Table 1.

TABLE 1

| | Composition | Water content [wt %] | Residual rate [%] | Amount of residue [mg] |
|---|---|---|---|---|
| Comparative Example 1 | Comparative composition 1 | 0.1 | 93.3 | 16.5 |
| Example 1 | Present composition 1 | 0.6 | 93.6 | 3.5 |
| Example 2 | Present composition 2 | 2.0 | 89.7 | 3.3 |
| Example 3 | Present composition 3 | 3.9 | 83.7 | 1.5 |
| Example 4 | Present composition 4 | 4.9 | 80.2 | 1.9 |
| Comparative Example 2 | Comparative composition 2 | 8.3 | 64.1 | 2.0 |

Test Example 3

The weeds (Palmer amaranth (*Amaranthus palmeri*), narrow leaf amaranthus (*Amaranthus graecizanus*), common ragweed (*Ambrosia artemisiaefolia*), giant ragweed (*Ambrosia trifida*), marestail (*Conyza canadensis*), common lambsquarters (*Chenopodium album*), kochia (*Kochia scoparia*), common barnyardgrass (*Echinochloa crus-galli*), and giant foxtail (*Setaria faberi*)) are seeded to a plastic pot containing soil. On the same day, the surface of soil is treated with a mixture of any one of present compositions 1 to 4, Agri-Dex (mixture of heavy paraffin oil, polyhydric alcohol fatty acid ester, and a polyethoxylate derivative, manufactured by Helena Chemical, specific gravity: 0.88), Intact (mixture of polyethylene glycol, choline chloride, and guar gum, manufactured by Precision Laboratories, specific gravity: 1.06), Vapex, a VaporGrip Xtra Agent (mixture of potassium hydroxide and acetic acid, manufactured by Kalo, specific gravity: 1.27), XtendiMAX Herbicide with VaporGrip Technology (dicamba diglycolamine salt, manufactured by Bayer, specific gravity: 1.2), and water. Their respective amounts in the treatment are 20 g/ha (in terms of the compound (I)) of the present composition, 1232 g/ha of Agri-Dex, 742 g/ha of Intact, 1858 g/ha of Vapex, a VaporGrip Xtra Agent, and 1931 g/ha of XtendiMAX Herbicide with VaporGrip Technology, and the amount of the spray liquid is 140 L/ha. Then, they are cultivated in a greenhouse. Seven days later, soybean is seeded. Fourteen days later, a weed control effect and a crop injury to the soybean are investigated. In the case of using any of the formulations, an excellent weed control effect is confirmed.

Test Example 4

The weeds (Palmer amaranth (*Amaranthus palmeri*), narrow leaf *amaranthus* (*Amaranthus graecizanus*), common ragweed (*Ambrosia artemisiaefolia*), giant ragweed (*Ambrosia trifida*), marestail (*Conyza canadensis*), common lambsquarters (*Chenopodium album*), *kochia* (*Kochia scoparia*), common barnyardgrass (*Echinochloa crus-galli*), and giant foxtail (*Setaria faberi*)) are seeded to a plastic pot containing soil. On the same day, the surface of soil is treated with a mixture of any one of present compositions 1 to 4, Agri-Dex (mixture of heavy paraffin oil, polyhydric alcohol fatty acid ester, and a polyethoxylate derivative, manufactured by Helena Chemical, specific gravity: 0.88), Intact (mixture of polyethylene glycol, choline chloride, and guar gum, manufactured by Precision Laboratories, specific gravity: 1.06), Vapex, a VaporGrip Xtra Agent (mixture of potassium hydroxide and acetic acid, manufactured by Kalo, specific gravity: 1.27), XtendiMAX Herbicide with VaporGrip Technology (dicamba diglycolamine salt, manufactured by Bayer, specific gravity: 1.2), and water. Their respective amounts in the treatment are 20 g/ha (in terms of the compound (I)) of the present composition, 1232 g/ha of Agri-Dex, 742 g/ha of Intact, 389 g/ha of Vapex, a VaporGrip Xtra Agent, and 1931 g/ha of XtendiMAX Herbicide with VaporGrip Technology, and the amount of the spray liquid is 140 L/ha. Then, they are cultivated in a greenhouse. Seven days later, soybean is seeded. Fourteen days later, a weed control effect and a crop injury to the soybean are investigated. In the case of using any of the formulations, an excellent weed control effect is confirmed.

The invention claimed is:

1. A solid pesticidal composition comprising a compound represented by the following formula (I), a surfactant, and a solid carrier, wherein a water content is 0.3 wt % or more and 5.0 wt % or less:

(I)

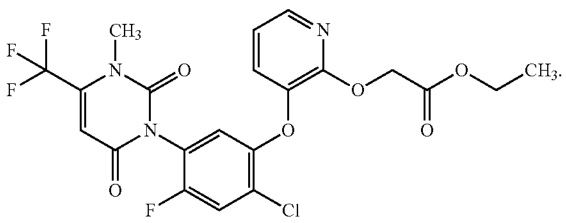

2. The solid pesticidal composition according to claim 1, wherein the surfactant comprises an anionic surfactant.

3. The solid pesticidal composition according to claim 1, wherein a shape of the solid pesticidal composition is a granular shape.

4. The solid pesticidal composition according to claim 2, wherein a shape of the solid pesticidal composition is a granular shape.

* * * * *